(12) United States Patent
McCarthy et al.

(10) Patent No.: US 6,255,384 B1
(45) Date of Patent: Jul. 3, 2001

(54) METHOD OF MANUFACTURING FLUOROPOLYMERS

(75) Inventors: Thomas F. McCarthy; Yan Chen, both of Lake Hiawath; Eric J. Rainal, Morristown, all of NJ (US)

(73) Assignee: AlliedSignal, Inc., Morris Township, NJ (US)

( * ) Notice: Subject to any disclaimer, the term of this patent is extended or adjusted under 35 U.S.C. 154(b) by 0 days.

(21) Appl. No.: 09/008,816

(22) Filed: Jan. 20, 1998

Related U.S. Application Data

(62) Division of application No. 08/741,500, filed on Oct. 31, 1996, now Pat. No. 5,955,556.
(60) Provisional application No. 60/007,282, filed on Nov. 6, 1995.

(51) Int. Cl.⁷ ...................................................... C08H 3/00
(52) U.S. Cl. .................... 524/805; 524/544; 524/545; 524/546; 526/81; 526/86; 526/249
(58) Field of Search ............................. 526/249, 86, 805, 526/81; 524/544, 545, 546, 805

(56) References Cited

U.S. PATENT DOCUMENTS 4,469,854  9/1984  Chandrasekaran ..................... 526/91
5,453,477  9/1995  Oxenrider et al. .................... 526/230

FOREIGN PATENT DOCUMENTS

| 0 006 346 | 1/1980 | (EP) . |
| 0 170 382 | 2/1986 | (EP) . |
| 0 215 624 | 3/1987 | (EP) . |
| 0 239 192 | 9/1987 | (EP) . |
| 2 312 513 | 12/1976 | (FR) . |
| WO 96/24622 | 8/1996 | (WO) . |

*Primary Examiner*—Bernard Lipman
(74) *Attorney, Agent, or Firm*—Roger H. Criss; Colleen D. Szuch

(57) ABSTRACT

The present invention provides a novel, optionally surfactant-free process for controlling particle number, particle size, and/or particle size distribution. The method of the invention also significantly improves monomer to polymer conversion rates, as well as, increases the level of polymer solids which can be emulsified/dispersed in water without polymer flocculation. Specifically, the improved process provides an aqueous dispersion of up to about 48% polymer solids in water in the absence of surfactant. The resulting fluoropolymers dispersions may be used in resin and coating applications.

13 Claims, 4 Drawing Sheets

METHOD OF MANUFACTURING FLUOROPOLYMERS

This application is a division of U.S. patent application Ser. No. 08/741,500 filed Oct. 31, 1996, now U.S. Pat. No. 5,955,556, which claims priority of Provisional Application Serial No. 60/007,282 filed Nov. 6, 1995.

BACKGROUND OF THE INVENTION

The present invention provides a novel, optionally surfactant-free process for controlling particle number, particle size, and/or particle size distribution. The method of the invention also significantly improves monomer to polymer conversion rates, as well as, increases the level of polymer solids which can be emulsified/dispersed in water without polymer flocculation. Specifically, the improved process provides an aqueous dispersion of up to about 50% polymer solids in water in the absence of surfactant. The resulting fluoropolymer dispersions may be used in resin and coating applications.

Methods for preparing solid homopolymers of chlorotrifluoroethylene (hereinafter sometimes referred to as "CTFE", and which polymers are sometime referred to as "PCTFE") as well as copolymers thereof including but not limited to CTFE-vinylidene fluoride, CTFE-tetrafluoroethylene, and CTFE-ethylene copolymers are wellknown in the art. See for example, Encyclopedia of Polymer Science and Engineering (John Wiley & Sons, 2nd Ed., vol. 3, pg 463, 1985); and U.S. Pat. Nos. 2,705,706; 2,700,622; 2,689,241; 2,569,524; 2,783,219; 2,820,026; 3,640,985; 3,671,510; 3,642,754; 3,632,847; and 3,014,015. As therein described, articles and films formed from PCTFE materials exhibit desirable vapor barrier properties, good thermal stability and resistance to strong oxidizing agents.

More specifically, processes suitable for the formation of the high molecular weight PCTFE homopolymers include, for example, free radical initiated polymerization either as bulk, suspension, or aqueous emulsion via the use of either a suitable initiator system, or alternatively with ionizing radiation. Copolymers of PCTFE, such as copolymerized PCTFE with vinylidene fluoride ("VDF") and/or tetrafluoroethylene ("TFE") are commonly produced via either suspension or emulsion polymerization processes. Generally, however, the use of comonomers is such that the weight percentage of the comonomers is relatively low, i.e., generally comprising a minor proportion of the total polymer as it is known that the desirable vapor barrier properties are substantially degraded by the inclusion of excessive amounts of comonomers.

While these processes provide useful methods for the production of PCTFE polymer resins and dispersions, various shortcomings in one or more of these processes have compelled the development of alternative novel methods for the production of PCTFE aqueous dispersions and polymer resins, a process which could be readily applied to other fluoroolefins.

One such shortcoming in the prior art is the use of high levels of expensive fluorinated surfactants in the conventional emulsion polymerization of fluoroolefins and the use of moderate quantities of fluorinated surfactants for suspension polymerizations (granular or slurry) which are difficult to recover. If the intention is to produce resin, the presence of even a small amount of such surfactants or soaps produces deleterious effects, i.e. promotes and stabilizes foam, impairs intercoat adhesion, and causes agglomeration of ordinarily immiscible media used for their separation. A method for recovering these fluorinated surfactants from spent polymerization mixtures is disclosed in U.S. Pat. No. 4,623,487. In coatings applications, the use of high levels of nonionic or ionic surfactants leads to discoloration upon high temperature processing, or in the case of room temperature coalescable coatings, leads to films with lower moisture and chemical barrier properties.

The present invention is a process improvement over the disclosures made in U.S. Pat. No. 5,453,477. In U.S. Pat. No. 5,453,477 a method is disclosed for the production of PCTFE/VDF resin suspensions using a catalyst system comprising t-butylhydroperoxide, sodium-m-bisulfite, and iron (II) sulfate hydrate. Although the disclosures in U.S. Pat. No. 5,453,477 describe stable resin suspensions, the process has been significantly improved. In this invention, a surfactant free emulsion polymerization method is disclosed which describes the production of highly stable PCTFE/VDF emulsions which can be obtained in: (1) higher percentages of stable self-emulsifiable fluoropolymer solids in water (42–48%) (2) at faster conversion rates of monomer to polymer and (3) in smaller particle sizes (0.17 microns). This is obtained by carefully tailoring the particle nucleation step and particle number generated in the early phase of polymerization. The fluoropolymer is best described as a self-emulsifying fluoropolymer mass whose polymer chains have sufficient quantities of terminal sulfonic acid end groups, such that fluoropolymer emulsions can be prepared having 40–48% percent solids in water, in the absence of added surfactant.

Although U.S. application Ser. No.: 08/207,973 filed on Mar. 7, 1994 U.S. Pat. No. 5,453,477 (pending) and U.S. application Ser. No.: 08/386,787 filed on Feb. 10, 1995 now abandoned (pending) have addressed novel methods for polymerizing fluoroolefins in the absence of surfactants, these applications do not relate to how the particle size, particle number, and particle distribution, and thus the latex stability of the resulting fluoroolefins may be controlled. It has been found that this inability to control the latex stability of the fluoroolefins often results in product coagulation during polymerization and thus a reduction in product yields.

Therefore, there remains a present and continuing need for the provision of fluoropolymer aqueous dispersions free from undesirable stabilizing additives such as ionic or nonionic surfactants, defoamers, and hydrocarbon perfluorinated or partially perfluorinated polar functional monomers required by the prior art for imparting stability to aqueous dispersions. There also remains a continuing need in the art for the production of improved fluoropolymers such as PCTFE homopolymers and copolymers thereof which feature improved machine processability, particularly in regard to conventional thermoforming and process equipment, and improved concentration or purification of the aqueous dispersions formed therefrom. It would further be desirable to provide a process for controlling the particle size, number, and/or distribution of fluoropolymers or copolymers thereof in aqueous dispersions in order to increase product yields and reduce coagulation.

DESCRIPTION OF THE INVENTION

In one embodiment, the invention relates to a process for controlling particle number and/or particle size of a fluoropolymer in an aqueous dispersion, in the absence of surfactants, comprising:

(a) reacting a mixture comprising a fluoroolefin, water and a radical initiator system comprising a reducing agent and an oxidizing agent wherein said radical initiator system is added in at least two charges, an initial charge and a continuous charge, and wherein the amount of said reducing agent in the initial charge is from about 100 to about 10,000 ppm based upon the total weight of polymer produced and the amount of oxidizing agent in the initial charge is from about 100 to about 10,000 ppm based upon the total weight of polymer produced.

This process produces an aqueous fluoropolymer dispersion having a particle size between about 0.01 microns and about 1.0 micron and a polymer solids content of about 50 weight percent all at conversion rates that are much higher than those obtained using processes of the prior art. See Example 10 and Comparative Example 2.

The invention also relates to stable, aqueous dispersions of fluoropolymer which may be used in resin and coating applications.

BRIEF DESCRIPTION OF THE DRAWINGS

The invention will be more fully understood and further advantages will become apparent when reference is made to the following detailed description of the invention and the accompanying drawings in which.

Figure 1:
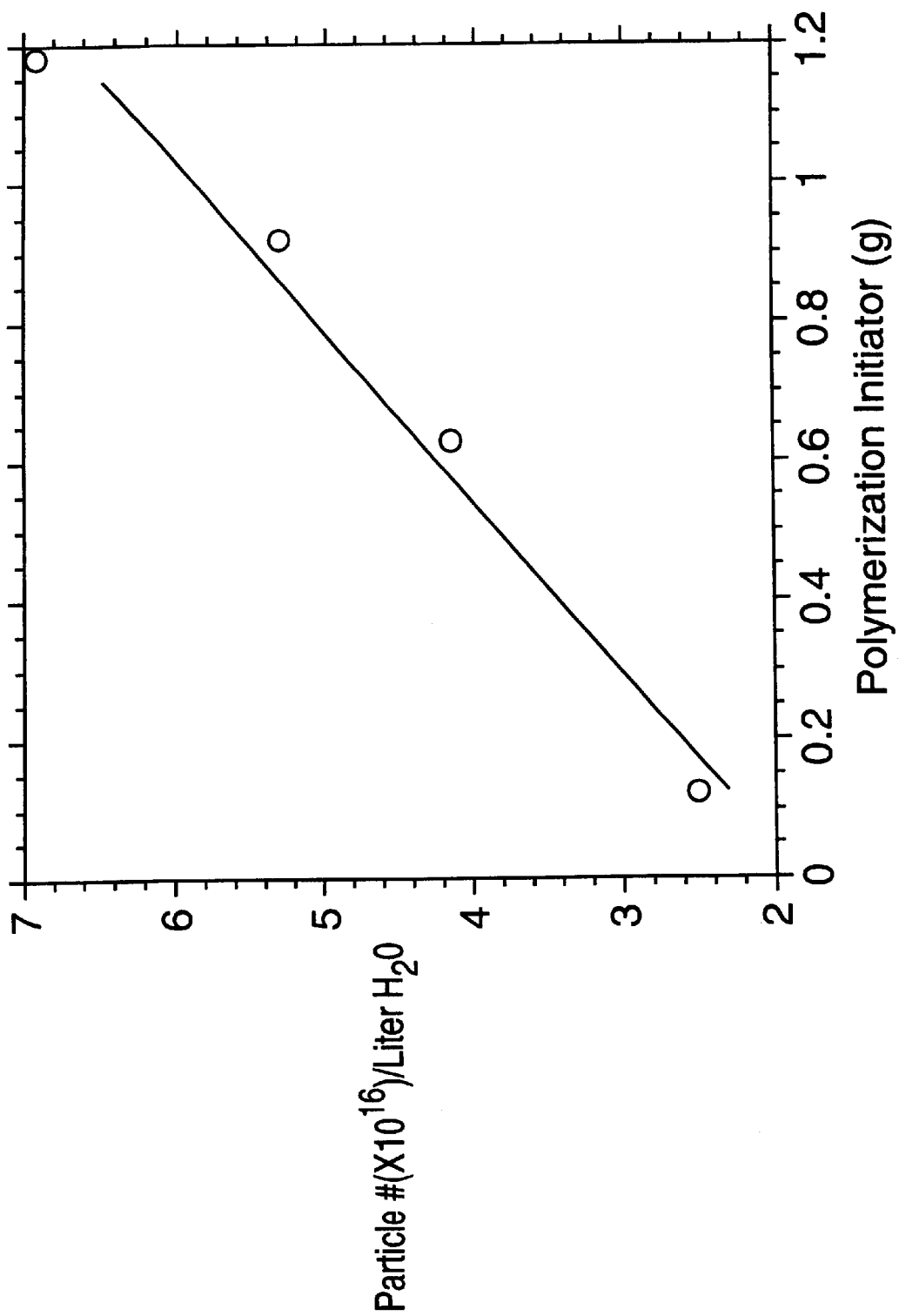
FIG. 1 is a graph of polymerization initiator versus particle number/L of polymer latex.

As used herein, "particle number" means the number of fluoropolymer particles competing for a given mass of polymerization product produced and is obtained by dividing the polymer mass by the product of the polymer volume and the polymer density. "Particle size" means the diameter of a spherical polymer particle dispersed in water and is measured using photon correlation spectroscopy. "Particle size distribution" means the distribution of particle sizes present in a given fluoropolymer dispersion. "Cumulative weight" means a percentage of the polymer particles having a size in microns greater than or equal to a given size. "Differential weight" means the first derivative of the cumulative weight and reflects changes in particle radius. "Monodisperse distribution" means that there is a single distribution of particle sizes within a polymer dispersion. "Bimodal distribution" means there are two separate distributions of particle sizes which do not overlap within a polymer dispersion.

Any fluoroolefin, combination of fluoroolefins, and combination of fluoroolefin(s) and non-fluoroolefin(s) may be used in the process of the invention. Suitable fluoroolefins include partially and perfluorinated olefins of from about 1 to about 12 carbon atoms and include compounds such as chlorotrifluoroethylene (CTFE); vinylidene fluoride (VDF); tetrafluoroethylene (TFE); hexafluoropropene (HFP); 1,2-difluoroethylene; 1,2-chlorodifluoroethylene; 1-chloro-1-fluoroethylene; fluorinated alkyl alpha olefins such as 3,3, 3,4,4-pentafluoro-1-butene and 3,3,3-trifluoropropene; fluorinated or nonfluorinated vinyl ethers of from about 1 to about 8 carbon atom such as perfluoro(propyl vinyl ether), perfluorinated methylvinylether and propylvinylether; perfluorodioxoles of from about 1 to about 10 carbon atoms such as perfluoro(1,3-dioxole) and perfluoro(2,2-dimethyl-1,3-dioxole) and partially and perfluorinated dienes of from about 1 to about 8 carbon atoms such as partially and perfluorinated derivatives of 1,4-butadiene and cis-isoprene. Suitable non-fluoroolefins include substituted and unsubstituted olefins of from about 1 to about 12 carbon atoms and include such compounds as ethylene, propylene and isobutylene; vinyl esters of from about 1 to about 12 carbon atoms such as vinyl acetate and vinylpropionate; dienes of from about 1 to about 8 carbon atoms such as 1,4-butadiene, and cis-isoprene. Most of the above mentioned materials are commercially available or can be prepared by methods well known in the art. CTFE, VDF and vinyl esters and combinations of these monomers are preferred. CTFE and VDF are most preferred.

The amount of olefin(s) used will depend upon the size of the reaction vessel and the amount of fluoropolymer which can be dispersed in water without polymer flocculation. The ratio of fluoroolefin to nonfluoroolefin is not critical.

Any radical initiator system or combination of systems which serve(s) a to simultaneously emulsify the fluoropolymer in the absence of surfactant may be employed in the process of the invention. Suitable systems include thermal radical initiators such as disuccinic acid peroxide, redox initiator systems and combination thereof. Redox initiator systems are preferred. Suitable oxidizing agents include, but are not limited to, metal persulfates such as potassium persulfate and ammonium persulfate; peroxides such as hydrogen peroxide, potassium peroxide, ammonium peroxide, tertiary butyl hydroperoxide ("TBHP")(CH$_3$)$_3$COOH), cumene hydroperoxide, and t-amyl hydroperoxide; manganese triacetate; potassium permanganate; ascorbic acid and mixtures thereof. Suitable reducing agents include, but are not limited to, sodium sulfites such as sodium bisulfite, sodium sulfite, sodium pyrosulfite, sodium-m-bisulfite ("MBS") (Na$_2$S$_2$O$_5$), ammonium sulfite monohydrate, and sodium thiosulfate; hydroxylamine; hydrazine; ferrous iron; organic acids such as oxalic acid, malonic acid, and citric acid and mixtures thereof.

Preferred redox initiator systems use an MBS reducing agent and a TBHP oxidizing agent. In a more preferred embodiment the initiator system also comprises a transition metal accelerator. Suitable transition metal accelerators include any of the transition metals. Copper, silver, titanium, ferrous iron, and mixtures thereof are preferred. Ferrous iron is most preferred. The accelerator is generally added with the reducing agent in the initial charge.

It has been unexpectedly found that by controlling the rate of addition and the amount of initiator in the initial charge, the ultimate particle size, particle number, and particle size distribution of the final fluoropolymer product, can be controlled. When the initiator is a redox intitiator system, generally, from about 10 to about 10,000 ppm and more preferably from about 100 to about 5,000 ppm and most preferably from about 150 to about 2,000 ppm of oxidizing agent based upon the total weight of the polymer produced is used in the initial charge. Generally, the amount of reducing agent in the initial change ranges from about 10 to about 10,000 ppm, and more preferably from about 100 to about 5,000 ppm and most preferably from about 150 to about 2,000 ppm based upon the total weight of the polymer produced. When the initiator system includes an accelerator; the accelerator is present in an amount of from about 5 to about 1000 ppm, more preferably from about 5 to about 250 ppm and most preferably from about 5 to about 50 ppm based upon the total weight of the polymer produced.

Optionally, in order to raise the solids content and/or increase the monomer to polymer conversion rate still further the redox initiator system may also include additional peroxide-based compounds including, but not limited to, diacyl peroxide, trichloroacyl peroxide, perfluorobutylacyl peroxide, acetyl peroxide, benzoyl peroxide, succinic acid peroxide, dialkyl peroxide, t-butyl peroxide, cumylperoxide, peroxydicarbonates, di(sec-butyl) peroxydicarbonate, 1,1-dimethyl-3-hydroxy-butyl peroxyneoheptanoate, peroxyesters, t-butyl peroxyacetate, and mixtures thereof. The amount of such peroxide-based compounds ranges from about 10 to about 50,000 ppm, more preferably from about 500 ppm to about 10,000 ppm and most preferably from about 500 to about 2500 ppm based upon the total weight of polymer produced. These compounds are generally added after the initial charge in a batchwise or continuous manner.

The form and composition of the polymerization reaction vessel is not critical. Preferably, conventional reactor kettles which can be pressurized to the required reaction pressures and preferably in excess of 3.45 MPa (500 psig) for safety considerations are used. Preferably, the reactor is either glass lined, stainless steel, or stainless steel coated with a typical fluoropolymer such as perfluorinated acrylates, PVDF, or any fluoropolymer coating known in the art. Preferably the vessel is coated with a perfluorinated acrylate. The geometry of the vessel is not critical; both vertically and horizontally disposed autoclaves may be used.

In a preferred embodiment, the reactor is a pressurizable vessel capable of withstanding internal pressure of at least 2.07 MPa (300 psi) and preferably at least 6.89 MPa (1000 psi), and is provided with a mechanical agitator which produces thorough mixing of the reactor contents and heat exchange system.

Any quantity of olefin may be charged to the reactor vessel. The monomers can be charged batchwise or in a continuous or semicontinuous manner. "Semi-continuous" means that a plurality of batches of the fluoromonomer are charged to the vessel during the course of the polymerization reaction. The independent rate at which the fluoromonomers are added to the reaction vessel will depend on the consumption rate of the monomer with time. The consumption rate is further related to agitation rate and concentration of polymer solids in water. In a preferred embodiment using about a 3.8 L vessel, a consumption rate from about 1 g to about 20 g of olefin/minute is employed. One of ordinary skill in the art can readily optimize the conditions of the reaction without undue experimentation to get the claimed results but the rate of olefin addition will generally be in the range of from about 1 to about 10 g of olefin/minute, and more preferably will equal the rate of monomer conversion to polymer such that a constant operating pressure in the vessel is achieved. The rate of monomer consumption/addition will increase during the course of polymerization as more polymer solids are produced.

The amount of water charged to the reaction vessel is not critical and is generally directly proportional to the volume of the vessel. In a preferred embodiment wherein the volume of the reaction vessel is about 3.8 Liters (1 gallon), from about 1 liter to about 3 liters of water may be used.

After at least an initial charge of olefin has been added, the initiator system is charged to the reaction vessel. At the outset of polymerization, the rate of addition and amount of the initiator system is critical. Generally, for a given amount of initiator in the initial charge, a rapid rate of addition will result in a larger particle number and a smaller particle size. The initiators may be added continuously throughout the entire polymerization reaction with changes only in the rate of addition or batchwise with an initial rapid charge (i.e, charging between about 10 to about 1,000 ppm/min over a period of from about 1 to about 40 minutes followed by a continuous charge (i.e. a relatively slower addition of initiator, i.e., between about 0.1 to about 30 ppm/min over the duration of the polymerization reaction). The total amount of continuously added initiator together with the polymerization temperature, determines the ultimate polymer molecular weight obtained. Particle size and distribution and thus particle number are defined after the initial charge of the initiator system has ceased. During the continuous charging of initiator, a lower concentration of redox initiator is added per unit time allowing particle growth to occur.

Generally, with increasing levels of the initial charge of initiator, decreasing particle sizes will be obtained. Typically, the mole ratio of olefin to either the oxidizing agent or reducing agent (the oxidizing agent and reducing agent are present in a 1:1 ratio) is from about 10 to about 10,000, more preferably from about 50 to about 1000, and most preferably from about 100 to about 500 moles of olefin: 1 mole of either reducing or oxidizing agent. These ratios will produce particle sizes ranging from about 0.05 to about 1 micron in diameter and having a molecular weight of from about 10,000 to about 1,000,000.

The duration of the polymerization reaction may continue until the liquid monomer is consumed, or preferably until there is a significant pressure drop, i.e. from about 1.22 GPa to about 0.34 GPa, in the reactor vessel, such that the further consumption of gaseous monomer starts to occur at a slow rate. The polymerization reaction time is directly proportional to the number of fluoropolymer emulsion particles generated during the initial charging of polymerization initiator.

The polymerization reaction proceeds until the desired polymerization product is achieved, with adjustment of the agitation rate during the polymerization to prevent premature coagulation of the particles. Although the agitation rate and reaction time will typically depend upon the amount of fluoropolymer product desired, one of ordinary skill in the art can readily optimize the conditions of the reaction without undue experimentation to get the claimed results but the agitation rate will generally be in the range of from about 5 to about 800 rpm, preferably from about 25 to about 700 rpm, depending on the design and size of the agitator and vessel, and the reaction time will range from about 1 to about 24 hours, preferably from about 1 to about 8 hours. A typical reaction time is about 2 to about 6 hours.

During the initiation of the polymerization reaction, the sealed reactor and its contents are pre-heated or cooled to the reaction temperature, although the temperature can be varied. Control of the reaction temperature is another important factor for establishing the final molecular weight of the fluoropolymers produced herein. A broad distribution or a bimodal distribution of molecular weight can be obtained by varying the polymerization temperature during the course of the polymerization. Generally the reaction temperature should range between about 0° C. to about 140° C., although temperatures above and below these values are also contemplated. The reaction pressure is preferably between from about 172 KPa to about 4.0 MPa, and more preferably from about 345 KPa to about 3.5 MPa.

During the polymerization reaction, fluoropolymer macromolecules are produced having inorganic, "surfactant-like" functional end groups which impart excellent latex stability to the polymer when these end groups are present in very low concentration. The fluoropolymers produced herein are thereby dispersed in the aqueous medium by the attachment of these inorganic fragments onto the end of the polymer repeating units, thus creating a surface active agent having both a hydrophobic component (the fluoropolymer) and a hydrophilic component (the attached—$SO_3H$ functionality in the case where the reducing agent is sodium metabisulfite). The attachment of these functionalized end groups in the initial charging of polymerization initiator lead to micelle formation.

The type of "surfactant like" end groups produced depends upon the type of initiator system selected and the optional addition of compounds which might undergo chain transfer and be incorporated into the polymer. Examples of such functional end groups include, but are not limited to, carboxylates, sulfonates, phosphonates, phosphates, and salts and acids thereof; ammonium salts; and any mixture thereof. Disuccinic acid peroxide is an example of a compound which can be incorporated into a polymer at low temperatures through chain transfer reactions or high temperature through homolytic cleavage.

When the reducing agent is sodium meta bisulfite, the sulfonic acid polymer end groups affect the emulsification of the fluoropolymers in water. The amount of these functional end groups in the latex can be determined by first purifying the latex by methods known to the art, such as by ion-exchange or dialysis, then titrating the latex with any known base such as aqueous sodium hydroxide or ammonium hydroxide, and then expressing the amount in terms of molar equivalents of titrated base. The amount of these functional end groups expressed in moles of equivalent NaOH may range between from about 0.0001 to about 0.5 moles of functional end groups/L of fluoropolymer latex obtained. The molar ratio of these functional end groups: fluoropolymer produced may range from about 1:10 to 10,000, preferably from about 1:10 to 1000, and more preferably from about 1:50 to 500. A typical fluoropolymer dispersion, as obtained in this invention, contains 0.01 molar equivalents/kg of dried polymer.

As shown in FIG. 1, the number of primary particles created as a result of the initial charge is approximately directly proportional to the amount of initiator system added during the initial charge. According to the present invention, the particle size can be broadly varied between from about 0.01 to about 1.0 microns, and more preferably from about 0.05 to about 0.5 microns when the concentration of polymerization initiator in the initial phase of polymerization is broadly varied between from about 10 to about 10,000 ppm in the absence of fugitive surfactant molecules. As used herein, "fugitive surfactant molecules" means any emulsifying molecule not directly bound to the fluoropolymer mass.

After a given quantity of monomer is polymerized, the size of fluoropolymer particles may be determined by light scattering methods known in the art, after which the particle number can be calculated based upon the volume, density, and number of fluoropolymer particles divided into the given polymer mass over which the particles are distributed. Thus, the particle size is inversely related to particle number.

Figure 2:
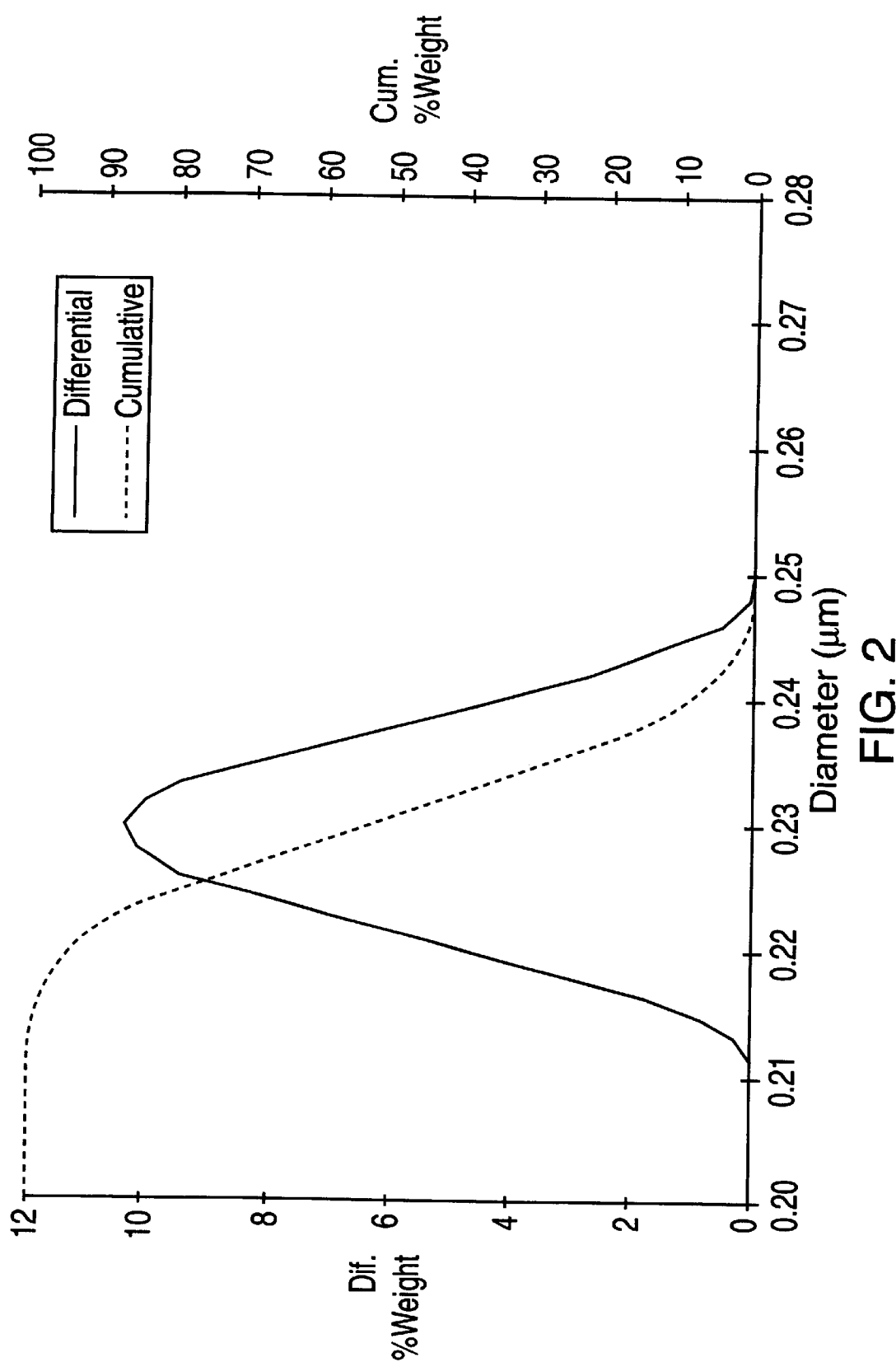
FIG. 2 is a graph reflecting the size distribution of the PCTFE aqueous dispersions produced in Example 4.

In the absence of added surfactant, the resulting particle distribution of the dispersion produced according to the process of the present invention will be monodisperse and narrow as shown in FIG. 2. A monodisperse distribution of emulsion particles is typically used in seeded emulsion polymerizations wherein a narrow distribution of particles is used to "seed" or control the subsequent polymerization. Generally, the monodisperse particle distribution ranges between about 0.1 microns and about 0.4 microns, and more preferably from about 0.1 to about 0.3 microns. Bimodal distributions can be obtained when a surfactant is added after the primary particles have already been created (after the initial charge of initiator) and is typically used for preparing latexes of ultra high polymer solids in water.

Although a stable aqueous dispersion of fluoropolymer particles can be obtained in the absence of any added surfactant, commercially available surfactant(s) may optionally be pre-charged or batchwise added during or subsequent to the onset of polymerization to further manipulate particle size, particle number and particle distribution. Any surfactant which is known to be useful in the manufacture of fluoropolymers may be used. These surfactants include, but are not limited to, anionic, cationic, or nonionic surfactants. Examples of suitable anionic surfactants include perfluorinated ammonium octanoate and metal fluoroalkylsulfonate salts (as described in U.S. Pat. No. 4,469,846), and their hydrocarbon analogues. Suitable cationic surfactants include fluorinated alkyl quaternary ammonium iodides. Suitable nonionic surfactants include fluorinated alkylpolyoxyethylenealcohols and fluorinated alkylalkoxylates. Suitable surfactants may be perfluorinated, fluorinated, or non fluorinated. Perfluorinated anionic surfactants are more preferred.

The amount of surfactant, the rate of addition and time at which the initiator is added to the polymeric solution are dependent upon the size and quantity of particles desired. Generally, the more surfactant that is added, the smaller the fluoropolymer particles produced and the greater the number of particles produced. One of ordinary skill in the art can readily optimize the conditions of the reaction without undue experimentation to get the claimed results but the amount of surfactant is typically added at a rate such that the surfactant concentration in the reactor ranges between from about 50 ppm to about 5,000 ppm, yielding fluoropolymers in the range of from about $1.0 \times 10^{14}$ particles/L to about $1.0 \times 10^{18}$ particles/L.

Figure 3:
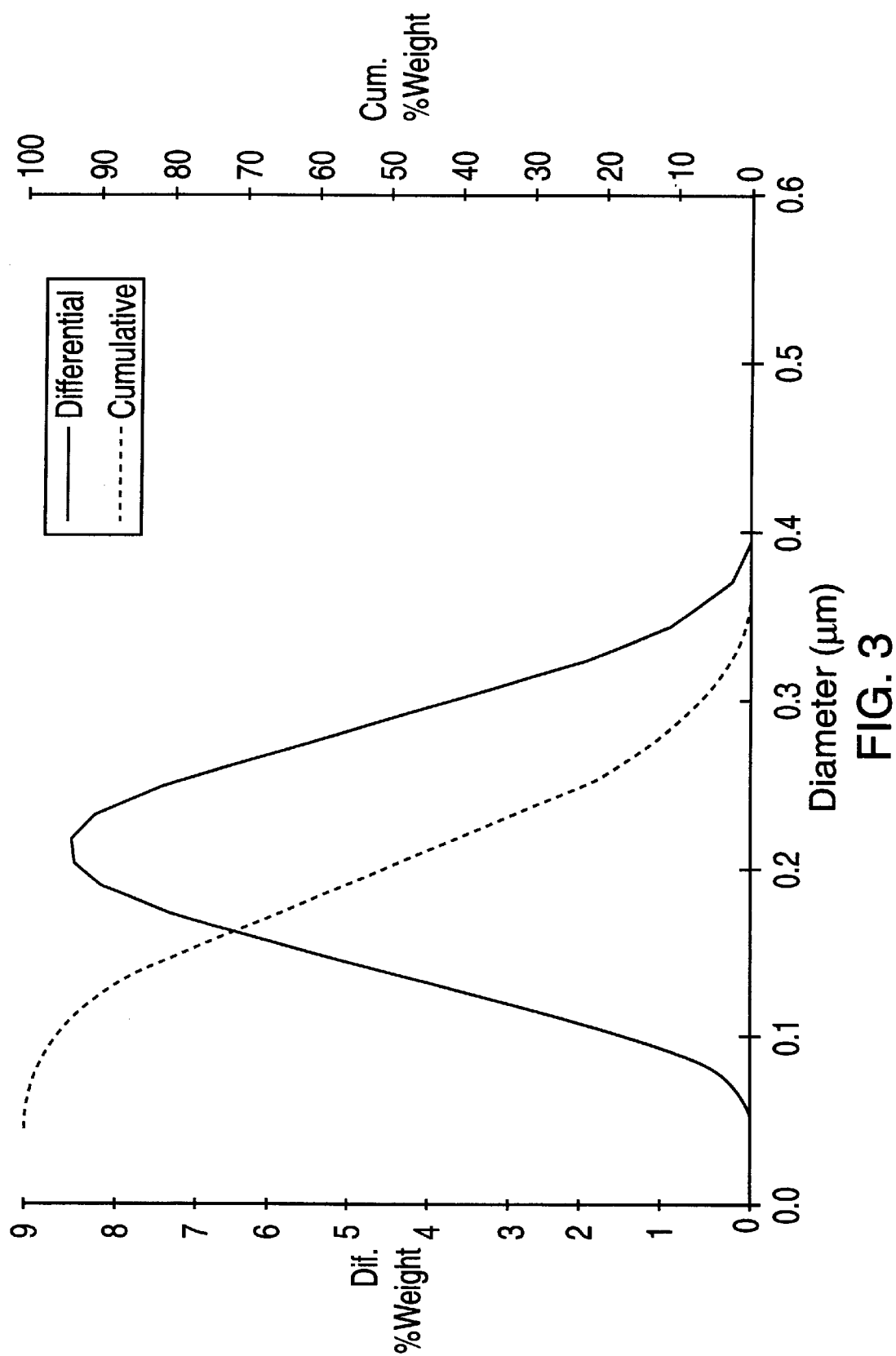
FIG. 3 is a graph reflecting the size distribution of the PCTFE aqueous dispersions produced in Example 7.
Figure 4:
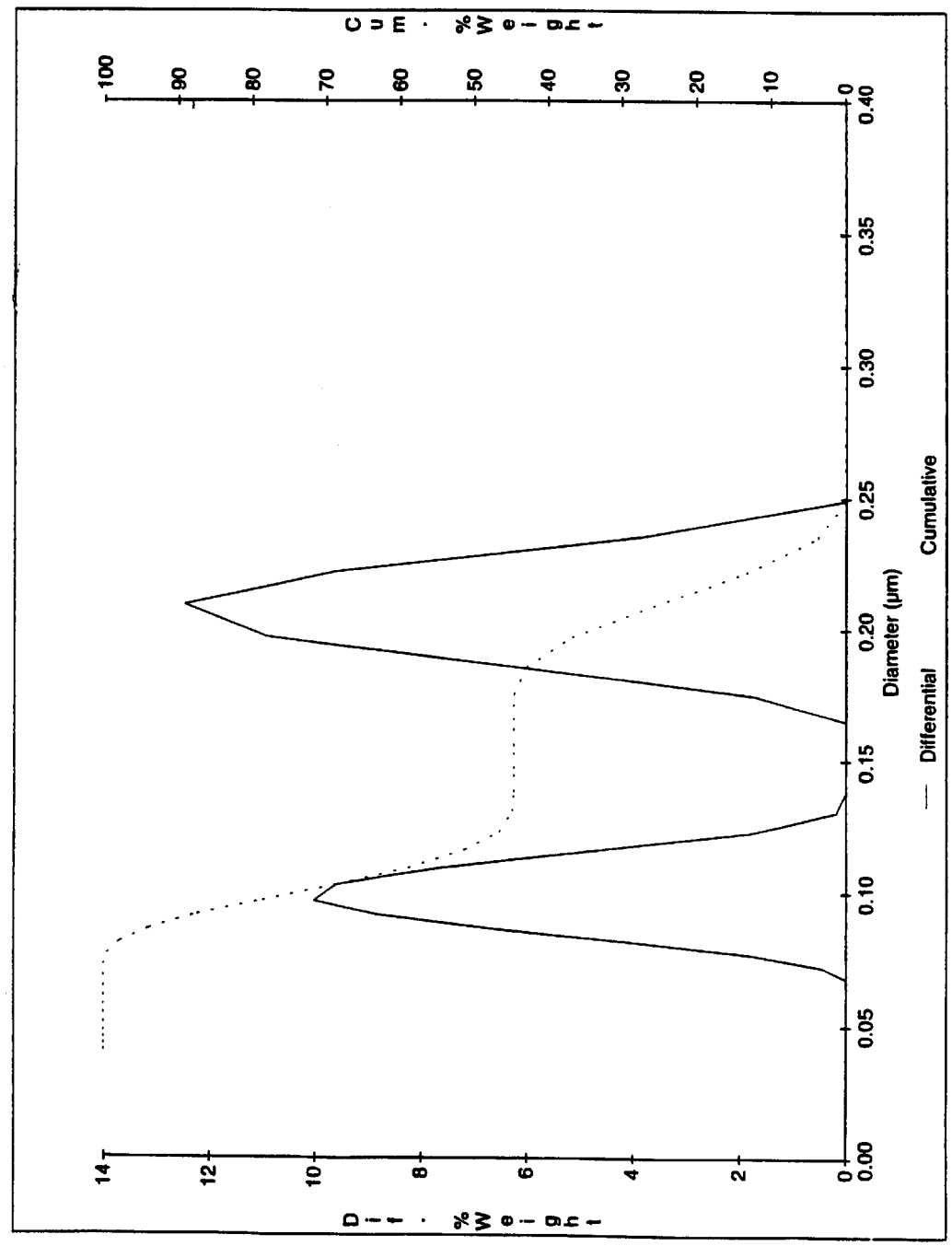
FIG. 4 is a graph reflecting the size distribution of the PCTFE aqueous dispersions produced in Example 8.

As mentioned above, when the surfactant is post-added (i.e., added after the initial charge of initiator), a second distribution of fluoropolymer particles can be created. Whether the second distribution overlaps with the first or is bimodal will depend upon the rate at which the surfactant is post added and the amount of time that has elapsed since the onset of polymerization. If the surfactant is slowly post-added, i.e. added over a period of from about 5 to about 15 minutes immediately following the initial charge, a broad distribution of particles sizes can be achieved as shown in FIG. 3 (Example 7). A broad distribution of particle sizes allows the preparation of latexes having high solids, In FIG. 3, new particles are created over the entire 5 to 15 minute period; however, since the first-created particles have the opportunity to begin growth earlier, the end result is a broader distribution of particle sizes. If the surfactant is rapidly post-added, i.e. added over a period of less than 5 minutes, immediately following the initial charge, a narrow, multiple distribution of particles may be prepared with no overlap of their respective particle size distributions as shown in FIG. 4 (Example 8).

In another embodiment of the present invention, emulsion stabilizers may be post-added to further improve latex stability, i.e. reduce the coagulation tendency of the resulting stable aqueous dispersion. Suitable emulsion stabilizers may be carboxylic acid containing organic chemicals which become incorporated into a polymer through either chain transfer reactions or simple homolytic cleavage to form free radicals. Disuccinic acid peroxide is an example of a carboxylic acid containing peroxide which can introduce carboxylic acid functionality into a polymer by either a thermal free radical process or a chain transfer process. The temperature at which DSAP is post-added to the polymerization mixture, according to prior art, is typically greater than about 70° C., in which case carboxylic acid functionality is incorporated into a polymer through both thermally induced decomposition and chain transfer processes. However, in combination with other free radical initiators, DSAP can provide carboxylic acid functionality into a polymer at much lower temperatures through chain transfer reactions or free radical induced decomposition. Chloroacetic acid is another example of a carboxylic acid containing organic chemical which can impart carboxylic acid functionality into a polymer at low temperatures through chain transfer reactions. DSAP is preferred. Using DSAP, dispersions can be obtained having 48% solids in water in the absence of any fugitive surfactants.

The amount of added stabilizer may range, based upon the total weight of fluoropolymer solids produced, from about 0.01 % to about 5%, preferably from about 0.05% to about 1%.

The polymerization may also be conducted in the presence of a chain transfer agent to further control molecular weight. Any chain transfer agent known to be useful in fluoropolymer manufacture may be used. Examples of suitable chain transfer agents include alcohols, ketones, and carboxylic acid esters, halocarbons, mercaptans, for example, isopropanol, methanol, acetone, ethyl acetate, chloroform, 1,1,2,2-tetrachloroethane, bromotrichloromethane, or butylmercaptan; and others as disclosed in U.S. Pat. No. 3,069,401. Said amounts of chain transfer agents range from about 0.1 to about 10% depending on the molecular weight desired.

At the conclusion of the polymerization reaction, the resulting fluoropolymer dispersion may be removed from the reactor and isolated as a resin using any well known conventional isolation means such as: coagulation followed by filtration or centrifuging. Alternatively, the stable dispersion product may be directly used in coating applications.

The fluoropolymers prepared according to the present invention can be formulated into various coatings. They may be formulated into a release coating for anti-graffiti and other applications, for example, by first optionally removing iron from the dispersion (to remove color) by methods known in the art (e.g., ion-exchange); adjusting the pH of the latex to from about 4–6 using, for example, a metal citric acid salt (e.g., lithium, sodium, or potassium citrate); and finally further adjusting the pH to 8.0 or greater (e.g, with lithium, sodium, ammonium, or potassium carbonate or hydroxide or ammonia). The preferred method for adjusting the pH is to use a combination of a metal citric acid salt and a metal carbonate salt. A wetting agent, re-wetting agent and optionally a coalescent are then generally added to this dispersion. Typical release coating formulations are reported in U.S. Pat. No. 5,075,065 which is incorporated by reference. See also Example 14.

For best results, the pH of the fluoropolymer dispersion should be adjusted in the presence of a nonionic or anionic surfactant which stabilizes the dispersion for future finishing steps and acts as a wetting agent. A suitable surfactants include fluorinated or nonfluorinated anionic surfactants such as ammonium perfluorinated octanoate, potassium (ammonium) fluorinated alkyl carboxylates, ammonium octanoate, or ammonium laurate, ethylene oxide and/or propylene oxide derived nonionic surfactants including ethoxylated and propoxylated alkyl phenols and ethoxylated alkylphenols. Suitable nonionic surfactants include octylphenoxypolyethoxyethanol and silicon containing nonionic surfactants such as polyalkylene oxide modified polymethylsiloxane. To further improve the wetting or film coalescence properties of the dispersion or as an alternative to the use of surfactants, alcohols of from 1 to 8 carbon atoms such as ethyl alcohol, isopropanol, and butanol may be added to the dispersion. Alternatively alkyl diols of from about 1 to about 6 carbon atoms such as ethylene glycol, or low molecular weight oligomers of ethylene oxide and/or propylene oxide having from 2–6 repeating units may be used. Fluorosurfactants are typically used in an amount from about 0.1–2.0 weight percent; nonionic surfactants are typically used in an amount from about 0.5–8 wt. %, alcohols are used in amounts from about 0.1–5 wt. %, alkyl diols or low molecular weight oligomers of propylene oxide and/or ethylene oxide are used in quantities ranging from about 0.5–6 wt. %.

When the dispersion is formulated into a binder, a number of well known additional components may be added to the dispersion including internal and external coalescing agents, crosslinking agents, leveling agents, pigments, thickeners, UV absorbers, plasticizers, biocides, and the like. See e.g. Handbook of Organic Coatings: A Comprehensive Guide for the Coatings Industry, (NY 1990).

The fluoropolymer aqueous dispersions produced according to the present invention are highly stable and exhibit good shelf stability. If left undisturbed for several months, the dispersion will separate into an upper, lighter aqueous phase, and a lower, more concentrated phase. The dispersion may be readily reconstituted by simply mixing these phases.

Because the fluoropolymer may be prepared without unbound surfactants, the invention gives a coating formulator great flexibility in formulation design. The fluoropolymer aqueous dispersions of the invention may be used in applications where the presence of fugitive fluorosurfactants would be deleterious (e.g. circuit board applications where fugitive surfactant could influence the dielectric constant).

The fluoropolymers may be used in other coating applications besides release coatings. The dispersion may be used in architectural coatings, fiberglass reinforced coatings, (internal and external); and fabric coatings (e.g., luggage and textiles). The dispersion may also be utilized in multi-layer film structures; single and multi-layer circuit board constructions; and in coatings for original equipment manufactured ("OEM") goods. Examples of coatings for OEM goods include, but are not limited to, coatings for vehicles for air, land and sea, appliances, machinery, furniture and pipes. The fluoropolymers may also be used in food packaging applications. The fluoropolymer dispersion might also be coated onto another polymer substrate such as a polyimide or polyester and subsequently used as a release film.

The fluoropolymer dispersion is also useful as an additive to waxes, cosmetics, and inks, as well as, a processing aid for polyolefins. Dispersions containing low molecular weight polymers are useful as an additive to other dispersions containing high molecular weight fluoropolymers to improve latex coalescence (lower processing temperatures) and improve melt flow.

Alternatively, the fluoropolymer dispersions can be coagulated (flocculated) into resin by means well known in the art and used in extrusion applications. The resin can be used to extrusion coat metal in wire and cable applications such as heating cable, downhole cable and hook-up wire.

The resin can also be used to produce tubing, hose, syphons, or fuel lines and can be molded into shaped parts such as lab ware, seals, rings or bearings. The resulting resin can also be extruded into film, roll covers, packaging, linings, fiber, gaskets, or tape.

The invention is more readily and fully understood by reference to the following examples.

EXAMPLES

Example 1
Preparation of PCTFE Latex without Unbound Surfactant.

A 3.8 liter stainless steel autoclave was charged with 1100 ml of deoxygenated deionized water. At room temperature, the autoclave was filled with nitrogen, then evacuated; this was repeated for a total of seven times. The autoclave was then charged with 300 g of CTFE and 10 g of VDF and the temperature increased to 40° C. yielding a pressure of 1.19 Pa (172 psig).

Initial charges of two separate polymerization initiator streams were added simultaneously to the autoclave at a rate of 1.25 ml/min over a period of 40 minutes: 0.15 g of a solution comprising 70 weight percent of t-BHP aqueous solution (available from Aldrich Chemical Co., Inc.) diluted to 50 ml with deionized water ("T-BHP Solution"); and 0.128 g MBS and 0.3 g ferrous sulfate heptahydrate (Fe $(SO_4)_2 \times 7H_2O$) diluted to 50 ml with deionized water ("MBS/Fe Solution").

After the addition of the initial charges, two additional, independent continuous charges (5.77 g of T-BHP Solution and 4.88 g of a MBS solution, each separately diluted to 200 ml with deionized water) were then supplied simultaneously and continuously into the autoclave from two separate 200 ml reservoirs at a rate of at least 0.25 ml/min, respectively, for 5 hours. The temperature in the autoclave ranged between about 40° C. and 45° C., while the pressure dropped to 1.16 Pa (168.3 psig).

Independent streams of CTFE and VDF were also continuously fed into the autoclave at a rate of about 0.5 g/min and 10 g/min, respectively, in order to maintain an internal pressure therein of about 0.97 MPa and about 1.24 MPa (140 to 180 psig). After the polymerization reaction proceeded for a total of 5 hours, a total of 950 g of CTFE and 32 g of VDF had been added to the autoclave which at the end of the 5 hour period had attained a pressure of 0.62 MPa (90 psig). The autoclave was then vented, and the latex product obtained therefrom, which was gravimetrically analyzed, was found to contain 766 g of PCTFE polymer (36% solids).

Examples 2–5
Preparation of PCTFE Latexes without Unbound Surfactant.

The experiment reported in Example 1 above was repeated using the catalysts, deionized water, monomers, and catalyst addition times reported in Table 1 below.

TABLE 1

|  | Ex. 1 | Ex. 2 | Ex. 3 | Ex. 4 | Ex. 5 |
| --- | --- | --- | --- | --- | --- |
| CTFE (initial charge, g) | 300 | 350 | 360 | 75 | 650 |
| VF2 (initial charge, g) | 10 | 12 | 30 | 6 | — |
| Vac (initial charge, g) | — | — | — | — | 4 |
| Deionized Water (g) | 1100 | 1100 | 1600 | 1300 | 2300 |

TABLE 1-continued

|  | Ex. 1 | Ex. 2 | Ex. 3 | Ex. 4 | Ex. 5 |
| --- | --- | --- | --- | --- | --- |
| $Fe(SO_4)_2 \times 7H_2O$ (g) | 0.1 | 0.15 | 0.3 | 0.22 | — |
| Addition Time for MBS* (min) | 40 | 20 | 10 | 10 | 20 |
| Addition Time for t-BHP* (min) | 40 | 20 | 10 | 10 | 20 |
| Initial charge MBS (g; ppm) | 0.13; 118 | 0.63; 572 | 0.92; 575 | 1.18; 907 | 0.24; 104 |
| Initial charge t-BHP (g) | 0.15 | 0.74 | 1.19 | 1.40 | 0.28 |
| Diameter ($\mu m$) | 0.30 | 0.31 | 0.24 | 0.24 | 0.25 |
| # particles ($\times 10^6$) | 2.76 | 4.58 | 8.54 | 9.02 | 3.71 |
| # particles/ L ($\times 10^{16}$) | 2.51 | 4.16 | 5.33 | 6.94 | 1.61 |
| Conversion Rate (g/min) | 2.55 | 3.88 | 5.33 | 6.94 | 1.61 |

\* = based upon addition of initial charge
Vac = vinylacetate

These Examples illustrate that by varying the amount of the initial charge of redox initiator, it is possible to control the size of the resulting PCTFE particles without altering their monodisperse distributions and, more importantly, the particle number, which may range from $2.5 \times 10^{16}$ to $7.0 \times 10^{16}$ as shown in FIG. 1. More specifically, as the amount of the "initial charge" of MBS and t-BHP increases, the particle number increases while the particle size depends further upon the amount of monomer charged to the autoclave. Because it is the number of particles that compete for a given mass of olefin, it is the particle number which is most critical in defining particle size.

Example 5 demonstrates that the technology can be expanded to other olefins such as vinylacetate, a vinylester. These examples show that in the absence of unbound surfactant, a monodisperse distribution of particle sizes may be obtained as shown in FIG. 2.

Example 6
PCTFE Polymerization With Post-Added Surfactant

A 3.8 liter stainless steel autoclave was charged with 1200 ml of deoxygenated deionized water. At room temperature, the autoclave was charged with 235 g of CTFE and 15 g of VDF ("Monomer Charge 1"). The autoclave was then heated to a temperature of 41° C. yielding a pressure of 1.19 MPa (172.8 psig).

Initial charges of two separate polymerization initiator streams were added simultaneously to the autoclave at a rate of 5 ml/min over a period of 10 minutes: 1.2 g of T-BHP Solution diluted to 50 ml with deionized water; and 0.98 g of MBS and 0.3 g ferrous sulfate heptahydrate solution diluted to 50 ml with deionized water.

Two continuous charge streams of initiator (4.6 g of T-BHP Solution diluted to 100 ml with deionized water; and 3.5 g of MBS Solution diluted to 100 ml with deionized water) were then simultaneously added to the autoclave from two separate 100 ml reservoirs both at a rate of 0.33 ml/min.

After 17 minutes of charging the continuous streams of initiators, the pressure in the autoclave had increased to 1.23 MPa (179.0 psig), and 25 ml of a lithium salt of a perfluorinated octyl sulphonate fluorosurfactant available from Minnesota Mining and Manufacturing Co. under the tradename "FC94" was then added to the autoclave over a period of 1 minute.

After the initial charges of monomers were polymerized, the following charges of monomer were charged batchwise in the following order to the autoclave over a period of 191 minutes: (Monomer Charge 2) 235 g CTFE and 15 g VDF; (Monomer Charge 3) 63 g VDF and 63 g CFTE; and (Monomer Charge 4) 63 g VDF and 63 g CTFE. 11.12 g of 2-hydroxyethyl vinyl ether was then charged to the autoclave during the consumption of monomer charges 3 and 4.

After the polymerization reaction proceeded for four hours, the autoclave was vented. Analysis of the resulting latex via photon correlation spectroscopy showed two separate peaks: one from 0.07–0.15 microns ($d_{w1}$=0.106), and one from 0.17–0.30 microns ($d_{w2}$=0.237) where $d_w$, the weight average distribution, is 0.197 microns. The particle number was determined to be $1.04 \times 10^{17}$ corresponding to $6.12 \times 10^{16}$ particles/L.

This Example shows that a bimodal distribution of particles sizes may be obtained with the addition of a fluorosurfactant after the onset of polymerization, although the largest peak is the distribution 0.17–0.3 microns.

Example 7
PCTFE Polymerization With Post-Added Surfactant

The experiment set forth in Example 6 was repeated but with the following exceptions: 1) 10 ml of the fluorosurfactant were added over a period of 7 minutes immediately following the complete charging of the initial amount of polymerization initiator and coinciding with metering of the polymerization initiators from the 100 ml reservoirs; 2) After polymerization of the initial charge of monomers, the following charges of monomer were charged batchwise to the autoclave in this order: (Monomer Charge 2) 188 g CTFE and 12 g VDF; (Monomer Charge 3) 291 g CTFE and 9 g VDF; (Monomer Charge 4) 87.5 g CTFE and 38 g VDF; and (Monomer Charge 5) 87.5 g CTFE and 38 g VDF. Instead of 2-hydroxyethyl vinyl ether, a mixture of 10 g of vinyl acetic acid and 2.5 g of 2-acrylimido-2-methylpropane sulfonic acid diluted to 50 ml with deionized water was added continuously at a rate of 0.20 ml/min during consumption of the last two charges.

Photon correlation analysis of the resulting latex revealed that the resulting latex had one broad peak ranging from 0.06–0.4 microns ($d_w$=0.196 microns). The particle number was determined to be $1.10 \times 10^{17}$, or $5.62 \times 10^{16}$ particles/L.

This Example shows that a very broad particle size distribution can be obtained if desired as shown in FIG. 3.

Example 8
PCTFE Polymerization with Post-Added Surfactant

The experiment set forth in Example 6 was repeated but with the following exceptions: 1) 10 ml of FC-118, (perfluorinated ammonium octonoate) available from Minnesota Mining and Manufacturing Co. were added over a period of 1 minute immediately following the complete charging of the initial amounts of polymerization initiator and coinciding with metering of the polymerization initiators from the 100 ml reservoirs; 2) After polymerization of the initial charge of monomers, the following charges of monomer were charged batchwise to the autoclave: (Monomer Charge 2) 188 g CTFE and 12 g VDF; (Monomer Charge 3) 291 g CTFE and 10 g VDF; (Monomer Charge 4) 88 g CTFE and 45 g VDF; (Monomer Charge 5) 88 g CTFE and 45 g VDF; and 3) Instead of 2-hydroxyethyl vinyl ether, a mixture of 15 g of vinyl acetic acid and 2.0 g of 2-acrylimido-2-methylpropane sulfonic acid was added, diluted to 50 ml with deionized water and added continuously at a rate of 0.09 ml/min during consumption of the last two charges of monomer.

Photon correlation analysis of the resulting two separate particle size distributions showed a distribution from 0.07–0.13 microns ($d_{w1}$=0.098), and another distribution from 0.17–0.25 microns ($d_{w2}$=0.206) where $d_w$ is 0.146 microns. The particle number was determined to be $2.42 \times 10^{17}$, or $1.34 \times 10^{17}$ particles/L, respectively.

As illustrated in FIG. 4, this Example shows that a bimodal distribution can be obtained where the individual particle size distributions are very narrow and do not overlap, and where the average particle size is quite low.

Example 9
PCTFE Polymerization and Post-Added Disuccinic acid Peroxide

The experiment set forth in Example 6 was repeated but with the following exceptions: 1) Monomer Charge 1 was 200 g of CTFE and 10 g of VDF; 2) At 41° C., the pressure in the autoclave was 1.17 MPa (170.4 psig); 3) the continuous charges of initiator were added to the autoclave for 258 minutes; 4) No perfluorinated fluorosurfactant or 2-hydroxylethyl vinyl ether was used; 5) After the initial charges of monomers were polymerized, the following additional charges of monomer were charged batchwise in this order to the autoclave over a period of 200 minutes: (Monomer Charge 2) 200 g CTFE and 10 g VDF; (Monomer Charge 3) 200 g CTFE 10 g VDF; (Monomer Charge 4) 200 g CTFE and 10 g VDF; (Monomer Charge 5) 200 g CTFE and 10 g VDF; and (Monomer Charge 6) 200 g CTFE and 10 g VDF; and 6) After a total of 83 ml of t-BHP solution from the continuous charge had entered the autoclave, 0.833 g of disuccinic acid peroxide was then added to the autoclave at a rate of 0.005 g/min. DSAP was injected into the autoclave by addition to the t-BHP reservoir.

After allowing the polymerization reaction to proceed for a total of 258 minutes, the resulting latex was recovered and analyzed gravimetrically and found to contain 48% polymer solids.

This example shows that a fluoropolymer dispersion can be prepared having very high polymer solids in the absence of unbound fluorosurfactants.

Example 10
CTFE/VDF Polymerization to High Solids in the Absence of Unbound Surfactant A 37.85 L glass lined vessel was filled with 18.93 L of degassed, deionized water. The autoclave was pressurized with nitrogen and partially vented 7 times to ensure the removal of oxygen. The autoclave was then charged with 2.78 Kg of CTFE and 0.275 Kg of VDF to yield a pressure of 1.36 MPa. The autoclave was then charged with two separate solutions through two separate injection lines of (1a) 20.36 g (70% solution in water) of t-BHP diluted to 100 ml with deionized, degassed water, and (2a) 15.54 g of sodium m-bisulfite combined with 2.22 g iron (II) sulfate, diluted to 100 ml with deionized, degassed water. The redox catalysts were injected to the autoclave over a 12 minute period at a rate of 8.33 ml/min. After the injection of the initial charges of catalyst solutions the following two catalyst solutions were injected into the autoclave over the course of the polymerization: 72.71 ml of t-BHP diluted to 500 ml with deionized, degassed water, and 55.50 g of MBS diluted to 500 ml with 500 ml with deionized, degassed water, both at a rate of 83 ml/hour. During the course of the polymerization CTFE and VDF were fed into the autoclave in an approximate ratio of 10 parts CTFE to 1 part VDF. The fluoroolefins were injected into the autoclave at a rate equivalent to their consumption in order to maintain a pressure between 1.13–1.37 MPa at a temperature ranging from 38–40 C. After approximately six hours of polymerization, 13.65 Kg of CTFE and 1.35 Kg VDF had been injected into the autoclave, and a pressure of 0.36 MPa was obtained. The conversion rate of fluoromonomer to fluoropolymer was 42.0 g/minute. The remaining residual monomer was vented, and the latex degassed. 29.3 L of surfactant free latex was obtained having 42.4% fluoropolymer solids. Photon correlation analysis of the resulting monomodal narrow particle size showed a distribution from 0.157 to 0.183 microns ($d_w$=0.170 microns, $d_n$=0.170 microns, where $d_n$ is the number of distribution). This example demonstrates that using techniques described in this invention, on a commercial scale, aqueous disperions can be prepared having very high fluoropolymer solids, having particle sizes smaller than those cited in prior art, at a much higher conversion rate of monomer to polymer, in the absence of added surfactant/emulsifier. This is accomplished by careful tayloring of the particle nucleation step, ie. the particle number which is generated in the onset of the polymeriation (the initial charging of polymerization catalyst), over which the polymerized polymer mass will ultimately be distributed.

In Example 10, the agitation rate, olefin:initiator ratio and amount of co-monomer were optimized to produce small-sized particles. A particle size of 0.17 microns is obtained even after substantially higher conversion levels of monomer to polymer.

Example 11
CTFE/VDF Polymerization at Elevated Temperatures

A 3.8 liter stainless steel autoclave was charged with 1800 ml of deoxygenated deionized water. At room temperature, the autoclave was charged with 336 g of CTFE and 32 g of VDF (monomer charge 1). Initial charges of two separate polymerization initiator streams were added at a temperature of from about 55–65° C., simultaneously to the autoclave at a rate of 5 ml/min over a period of 10 minutes: 1.5 g of T-BHP Solution diluted to 50 ml with deionized water; and 1.28 g of MBS and 0.3 g ferrous sulfate heptahydrate solution diluted to 50 ml with deionized water.

Two continuous charge streams of initiator (11.8 g of T-BHP Solution diluted to 100 ml with deionized water; and 9.7 g of MBS Solution diluted to 100 ml with deionized water) were then simultaneously added to the autoclave from two separate 100 ml reservoirs both at a rate of 0.16 ml/min. With the consumption of the first monomer charges, four additional charges were added, each having 336 g CTFE and 32 g VDF. Charges 2 and 3 were conducted at from about 65–70° C., while charges 4 and 5 were made at about 90° C. After 180 minutes a pressure of 0.48 MPa was obtained and the autoclave was vented. The fluoropolymer dispersion was stable and contained 47% polymer solids in water. This example demonstrates that very high polymer solids in water can be obtained in the absence of unbound surfactant.

Example 12
CTFE/VDF Copolymerization Using a Chain Transfer Agent

Example 12 was conducted using the method and materials described in Example 11 above except as otherwise noted. Four charges of 420 g CTFE and 41 g VDF were added over the course of the polymerization. The initial charge of polymerization catalyst was conducted at about 45° C., after which the polymerization was conducted at about 100° C. After 20 minutes of charging, the slow continuous feed of polymerization initiator, 5.4 g of ethyl acetate diluted to 65 ml with deionized water, was charged to the autoclave at a rate of 1 ml/min. After 260 minutes, a pressure of 0.48 MPa was obtained and the autoclave was vented. 40% polymer solids in water was obtained. The dispersion was treated with an excess of sulfonated polystyrene ion-exchange resin, the hydrogen form, to remove cations. 50 g of latex was then charged into a cellulose ester dialysis membrane (32 mm flat tube) having a molecular weight cutoff of 6–8,000. The tube was clamped on both ends and submerged into a 1 L reservoir of deionized water. The deionized water was exchanged daily with fresh deionized water until a conductivity measurement indicative of deionized water was obtained. 25 g of the dispersion was titrated with a 0.05% solution of sodium hydroxide. The self-emulsifying fluoropolymer dispersion contained 0.010 molar equivalents of sulfonic acid terminated fluoropolymer/kg of dried polymer. This material is a low molecular weight fluoropolymer which is particularly useful as an internal flow lubricant for higher molecular weight fluoropolymers, or as an external flow lubricant for the processing of polyolefins.

Example 13
CTFE/VDF/Vinyl Propionate Copolymerization at Low Temperature

Example 13 was conducted using the method and materials of Example 12 above except as otherwise noted. To a 10 gallon glass lined autoclave was added 5 gallons of deionized water. CTFE and VDF were pumped batchwise into the autoclave as follows: CTFE: 2.27 kg, 3 kg, 3 kg, 3 kg, 2.4 g; VDF: 225 g, 170 g, 170 g, 170 g, 165 g. The first charge of CTFE and VDF was precharged to the autoclave prior to the addition of polymerization catalyst. The initial 10 minute charge of polymerization catalyst was added at a rate of 10 ml/min (20.36 g T-BHP, 15.54 g MBS, each diluted to 100 ml with deionized water respectively). 2.25 g iron(II)sulfate heptahydrate was added to the initial MBS charge. The entire polymerization was conducted at a temperature ranging from about 15–30° C. After the addition of the initial charge, the continuous charges of polymerization initiator were added at 1.5 ml/min (109 g T-BHP, 83 g MBS, each diluted to 750 ml with deionized water respectively). 20 minutes after the initial pumping of continuous polymerization initiator, 450 ml of vinylpropionate was pumped into the autoclave at an approximate rate of 2–3 ml/min, the addition of vinyl propionate being proportionate to the consumption of the fluoroolefin charges, in order to obtain a homogenous 3% incorporation of vinyl propionate in the terpolymer. After 4 hours of polymerization, the autoclave was vented at 0.28 MPa, yielding 41.4% polymer solids in water which represents a monomer to polymer conversion rate of 62.5 g/min. This conversion rate represents a significant improvement over the prior art.

Example 14
Formulation of Fluoropolvmer Dispersions into a Release Coating

To the dispersion of Example 13, is added 2.75 wt. % (based on polymer solids) polyalkyleneoxide modified heptamethyltrisiloxane (Silwet L-77, available from OSI Specialties, Inc.). A release coating is prepared by first removing iron from the dispersion by passing the dispersion through a sulfonated polystyrene ion-exchange (H-form) column. The pH is then adjusted to 5.0 by the addition of a 30% (aq) solution of lithium citrate. The pH is then adjusted to 9.0 using a dilute solution of lithium carbonate. One (1.0) weight percent (based upon polymer solids) of a potassium fluorinated alkyl carboxylate, (FC-129 available from the 3M Co), 4.0 weight percent of an ethoxylated alkyl phenol, (Tergitol 15-S-9 available from Union Carbide, Inc.), and 2 weight percent of ethylene glycol is added. The resulting coating is applied to steel sidewalls of a subway train. After the coating dries, ink from a marking pen is placed on the water steel surface. The markings are easily removed from the coated surface.

Comparative Example 1
Polymerization of PCTFE Latex Using Conventional Dispersion Polymerization with Unbound Surfactant A 3.8 L stainless steel autoclave was charged with 1200 ml of deoxygenated deionized water. The atmosphere was purged seven times with nitrogen and evacuated each time. After adding 10 ml of the perfluorinated ammonium octonoate of Example 8 thereto, the autoclave was then heated to about 41.5° C. The autoclave was then charged with 228 g CTFE and 23 g VDF (Monomer charge 1), yielding a pressure of 190.6 psig (1.31 MPa).

The initial and continuous charges of polymerization initiator were then carried out as described in Example 6. In order to maintain a pressure between about 100 to 200 psig (0.69–1.38 MPa) during the continuous charging of polymerization initiator, two additional quantities of CTFE and VDF were added batchwise to the autoclave: 228 g CTFE, 23 g VDF (Monomer charge 2); and 228 g CTFE, 28 g VDF (Monomer charge 3).

After the polymerization reaction proceeded for 162 minutes, a pressure of 58 psig (0.4 MPa) was obtained and the autoclave was vented. The fluoropolymer dispersion obtained therefrom contained 33% polymer solids. Photon correlation analysis of the resulting narrow particle size distribution showed a distribution from 0.22 to 0.25 microns (dw=0.232 microns; dn=0.232 microns, where dn is number average distribution; and particle number=$4.89 \times 10^{16}$, or $2.33 \times 10^{16}$ particles/L).

This experiment demonstrates that the use of prior art emulsification methods, wherein the fluorosurfactant is pre-charged to an autoclave prior to the onset of polymerization in order to emulsify the developing fluoropolymer mass, results in a lower particle number density (particles/L) than that obtained in the present invention in the absence of added surfactant. When an equivalent amount (10 ml) of fluorosurfactant is optionally post-added during the present invention (Example 8), dispersions having $1.34 \times 10^{17}$ particles/L were produced; which represents approximately 10 times more fluoropolymer particles produced than that produced by the conventional emulsion polymerization of this example, using the same amount of surfactant. This suggests that the amount of surfactant which is bound to the fluoropolymer mass in this invention is greater than that which can be typically obtained by the pre-polymerization addition of an emulsifying agent. Compare particle numbers of Examples 1–5 and comparative Example 1. Thus, the polymer mass obtained in this invention may be described as a "self-dispersing" or "self-emulsifying" fluorine containing macromolecule.

Comparative Example 2

Polymerization of PCTFE/VDF according to U.S. Pat. No. 5,453,477 Prior Art

The 10 gallon glass lined vessel as described in Example 11 was charged with 22.7 L of deionized, degassed water. Oxygen was purged from the vessel using nitrogen. The vessel was charged with 3.4 Kg CTFE, 0.12 Kg VDF, and heated to about 42° C. yielding a pressure of 1.14 MPa. The autoclave was then charged with two separate solutions through two separate injection lines of (1) 7.43 g (70% solution in water) of t-BHP diluted to 100 ml with deionized, degassed water, and (2) 6.30 g of sodium m-bisulfite combined with 1.80 g iron (II) sulfate, diluted to 100 ml with deionized, degassed water. The redox initiator was injected to the autoclave over a 20 minute period at a rate of 5.0 ml/min. After the injection of the initial initiator charge the following two initiator solutions were injected into the autoclave over the course of the polymerization: 36.0 ml of t-BHP diluted to 500 ml with deionized, degassed water, and 28.0 g of MBS and 0.75 g iron (II) sulfate diluted to 500 ml with 500 ml with deionized, degassed water, both at a rate of 50 ml/hour. CTFE and VDF were subsequently charged batchwise into the autoclave to maintain a pressure between 1.14 MPa and 1.38 MPa and a temperature from about 42–49° C. After 6.5 hours, 9.9 Kg of CTFE and 0.33 Kg of VDF had been charged to the autoclave, yielding a final pressure of 0.38 MPa. The autoclave was vented, yielding a fluoropolymer dispersion having 27.7 wt. % polymer solids. The conversion rate of fluoromonomer to polymer was 23.1 g/minute. This is contrasted with the conversion rate obtained by the process of the invention which rates are a multiple of those obtained in the prior art. See Example 13.

What is claimed:

1. An aqueous emulsion produced by an emulsion polymerization process comprising: (a) reacting a mixture comprising a fluoroolefin, water and a radical initiator system comprising a reducing agent and an oxidizing agent wherein said radical initiator system is added in at least two charges, an initial charge and a continuous charge and wherein the amount of said reducing agent in the initial charge is from about 100 to about 10,000 PPM based upon the total weight of polymer produced and the amount of oxidizing agent in the initial charge is from about 100 to about 10,000 PPM based upon the total weight of polymer produced.

2. The aqueous emulsion of claim 1 wherein said fluoroolefin comprises chlorotrifluoroethylene and vinylidene fluoride.

3. A coating formed from the emulsion of claim 1.

4. A coating formed from the emulsion of claim 2.

5. The coating of claim 3 wherein said coating is a release coating.

6. The coating of claim 3 wherein said coating is an architectural coating.

7. The emulsion of claim 1 wherein said emulsion is comprised of up to about 50 weight percent polymer solids in water.

8. The emulsion of claim 1 wherein said emulsion is comprised of from about 40 to about 48 weight percent polymer solids in water.

9. The emulsion of claim 1 which is absent of surfactants.

10. The emulsion of claim 1 which further comprises a surfactant.

11. The emulsion of claim 1 which comprises a fluoropolymer having both a hydrophobic component and a hydrophilic component.

12. The emulsion of claim 1 which comprises a fluoropolymer having a functional end group selected from the group consisting of carboxylates, sulfonates, phosphonates, phosphates, salts thereof, acids thereof, ammonium salts and mixtures thereof.

13. The emulsion of claim 1 which comprises fluoropolymer particles in an amount of from about $1.0 \times 10^{14}$ particles/liter to about $1.0 \times 10^{18}$ particles/liter.

* * * * *